United States Patent
Uchida et al.

(10) Patent No.: US 12,228,319 B2
(45) Date of Patent: Feb. 18, 2025

(54) MAINTENANCE RECOMMENDATION SYSTEM

(71) Applicant: Hitachi, Ltd., Tokyo (JP)

(72) Inventors: Takayuki Uchida, Tokyo (JP); Kazuki Horiwaki, Tokyo (JP); Shuntaro Hitomi, Tokyo (JP); Yasuharu Namba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 572 days.

(21) Appl. No.: 17/485,987

(22) Filed: Sep. 27, 2021

(65) Prior Publication Data

US 2022/0163246 A1    May 26, 2022

(30) Foreign Application Priority Data

Nov. 25, 2020   (JP) .................. 2020-194803

(51) Int. Cl.
*F25B 49/00*    (2006.01)

(52) U.S. Cl.
CPC .................. *F25B 49/005* (2013.01)

(58) Field of Classification Search
CPC ..... G06F 11/3055; G06F 10/04; F25B 49/005
See application file for complete search history.

(56) References Cited

U.S. PATENT DOCUMENTS

| | | |
|---|---|---|
| 2004/0123179 A1* | 6/2004 | Dragomir-Daescu ............... G06Q 10/04 714/1 |
| 2020/0081756 A1* | 3/2020 | Uchida ............... G06F 11/3055 |

FOREIGN PATENT DOCUMENTS

| | | |
|---|---|---|
| JP | 2009-211472 A | 9/2009 |
| JP | 2019-185422 A | 10/2019 |

* cited by examiner

*Primary Examiner* — Lam S Nguyen
(74) *Attorney, Agent, or Firm* — Foley & Lardner LLP (57) ABSTRACT

There is provided a maintenance recommendation system that creates an estimation model of failure modes of a new model of a device only from an occurrence probability of a failure mode. Based on an estimation model for an old model, the occurrence probability of a failure mode where a component is changed from the old model is updated only on a spot of a component change, and this creates an estimation model of failure modes intended for a new model newly commercially available. Thus, the attachment of the inspection result and the failure mode of a faulty facility is learned, an estimation model of failure modes is created to support facility maintenance services for a new model newly commercially available having a small amount of data of inspection results in failure daily reports for difficulty in learning.

10 Claims, 10 Drawing Sheets

| DEVICE MODEL (303) | COMPONENT (305) | COMPONENT TYPE (307) | FAILURE MODE (310) | OCCURRENCE PROBABILITY P (FAILURE MODE) (320) | EXPERIENCE (330) |
|---|---|---|---|---|---|
| MT1 | CONDENSER | PT1 | CONDENSER COLD WATER DECREASE | 0.05 | 10 |
| MT1 | COOLANT | PT2 | COOLANT LEAKAGE | 0.001 | 100 |
| MT1 | EVAPORATOR | PT3 | EVAPORATOR COLD WATER DECREASE | 0.01 | 20 |
| : | : | : | : | : | : |

FIG. 3B

| DEVICE MODEL (333) | COMPONENT (335) | COMPONENT TYPE (340) | FAILURE MODE (345) | OCCURRENCE PROBABILITY P (FAILURE MODE) (350) | EXPERIENCE (355) |
|---|---|---|---|---|---|
| MT1 | CONDENSER | PT1 | CONDENSER COLD WATER DECREASE | 0.05 | 10 |
| MT1 | COOLANT | PT2 | COOLANT LEAKAGE | 0.001 | 100 |
| MT1 | EVAPORATOR | PT3 | EVAPORATOR COLD WATER DECREASE | 0.01 | 20 |
| : | : | : | : | : | : |
| MT2 | CONDENSER | PT1 | CONDENSER COLD WATER DECREASE | 0.05 | 10 |
| MT2 | COOLANT | PT2-1 | COOLANT LEAKAGE | *** | *** |
| MT2 | EVAPORATOR | PT3-1 | EVAPORATOR COLD WATER DECREASE | 0.01 | 20 |
| : | : | : | : | : | : |

FIG. 4A

| DEVICE MODEL (405) | DEVICE COMPONENT (410) | COMPONENT TYPE (415) |
|---|---|---|
| MT1 | CONDENSER | PT1 |
| MT1 | COOLANT | PT2 |
| MT1 | EVAPORATOR | PT3 |
| : | : | : |

FIG. 4B

| DEVICE MODEL (425) | DEVICE COMPONENT (430) | COMPONENT TYPE (435) |
|---|---|---|
| MT1 | CONDENSER | PT1 |
| MT1 | COOLANT | PT2 |
| MT1 | EVAPORATOR | PT3 |
| : | : | : |
| MT2 | CONDENSER | PT1 |
| MT2 | COOLANT | PT2-1 |
| MT2 | EVAPORATOR | PT3-1 |
| : | : | : |

FIG. 5

| INSPECTION SITE | INSPECTION ITEM | INSPECTION ITEM BEHAVIOR | INSPECTION RESULT (1:AS BEHAVIOR 0:DIFFERENT FROM BEHAVIOR) |
|---|---|---|---|
| POWER SUPPLY UNIT | INPUT POWER | RISE | 1 |
| CONDENSER | OUTLET TEMPERATURE | RISE | 1 |
| CONDENSER | PRESSURE | RISE | 0 |
| | ⋮ | | ⋮ |

<<INITIAL INFORMATION INPUT>>

DEVICE MODEL | MT1  (1005)

| INSPECTION SITE (1010) | INSPECTION ITEM (1020) | INSPECTION ITEM BEHAVIOR (1030) | INSPECTION RESULT (1040) | |
|---|---|---|---|---|
| REFRIGERATOR | ALERT | ALERT A001 IS ISSUED | True☐ False☐ | ▽ |
| POWER SUPPLY UNIT | INPUT POWER | RISE | True☐ False☐ | |
| FREEZER | FUNCTION | IS REFRIGERATION FUNCTION EFFECTIVE ? | True☐ False☐ | |

[DIAGNOSE] ~ 1050

*FIG. 11*

FAILURE MODE OCCURRENCE PROBABILITY SETTING SCREEN FOR NEW MODEL

INPUT EXPERIENCE PARAMETER FOR FAILURE MODE OCCURRENCE PROBABILITY FOR NEW MODEL

| | DEVICE COMPONENT (1110) | COMPONENT TYPE (1115) | FAILURE MODE (1120) | FAILURE MODE OCCURRENCE PROBABILITY (1125) | EXPERIENCE PARAMETER (1130) |
|---|---|---|---|---|---|
| OLD MODEL MT1 | COOLANT | PT2 | COOLANT LEAKAGE | 0.05 | 10 |
| | EVAPORATOR | PT3 | EVAPORATOR COLD WATER DECREASE | 0.01 | 20 |

| | DEVICE COMPONENT (1140) | COMPONENT TYPE (1145) | FAILURE MODE (1150) | FAILURE MODE OCCURRENCE PROBABILITY (1155) | EXPERIENCE PARAMETER (1160) |
|---|---|---|---|---|---|
| NEW MODEL MT2 | COOLANT | PT2-1 | COOLANT LEAKAGE | 0.05 | 10 |
| | EVAPORATOR | PT3-1 | EVAPORATOR COLD WATER DECREASE | 0.01 | 20 |

[COMPLETE] ~ 1170

MAINTENANCE RECOMMENDATION SYSTEM

CLAIM OF PRIORITY

The present application claims priority from Japanese patent application JP 2020-194803 filed on Nov. 25, 2020, the content of which is hereby incorporated by reference into this application.

BACKGROUND OF THE INVENTION

The present invention relates to a technique that recommends an inspection spot at which a failure mode is identified at the time of occurrence of a failure in a device and that supports maintenance tasks for the device by estimating a failure mode from a result of the inspection.

In order to operate devices such as gas engines, elevators, mining and construction devices all the time, maintenance tasks for these devices are necessary. When a device fails, it is necessary to estimate which component is in what failure state, i.e., it is necessary to estimate the failure mode from the symptom or the inspection result. Therefore, a technique is closed in which a failure mode estimation model is created from data patterns for individual failure and updates are performed.

For example, in Japanese Unexamined Patent Application Publication No. 2009-211472, a technique is disclosed in which with the use of an estimation model having defined states of components of devices and having defined failure probabilities for individual user operation histories, what failure mode presently occurs is estimated using probabilities. The failure probability is estimated from the knowledge and experience of the designer of the device or from failure daily reports, for example, and is set on the model. The present technique discloses that the update of the occurrence probability of the failure mode having an occurrence frequency exceeding a certain value allows temporary updates corresponding to realities in the failure situations in the market.

Japanese Unexamined Patent Application Publication No. 2019-185422 discloses a technique in which data of inspection results in normal operation is learned when data at the time of failure is small, and an estimation model is created from small amounts of data of a failure mode and data of inspection results by transfer learning.

SUMMARY OF THE INVENTION

Although the failure daily report, which is the source of information on failure probability, often contains the failure mode, information on inspections conducted in the process of finding failures is mostly not written. This is because the operation time at each of maintenance sites is limited, and there is an obligation to report what failure mode is happening and what measures are taken although there is not necessarily an obligation to report what inspection is made. However, when a large amount of failure daily reports is available, it is highly likely to collect a necessary amount of daily reports on which inspection items are written even though there are not many such reports. However, this is difficult for new model devices in that have been recently shipped to the market.

An object of the present invention is to solve the problem above and to provide a maintenance recommendation system that accurately estimates a failure mode even on a new model and that is capable of supporting maintenance tasks for devices.

In order to solve the problems, an aspect of the present invention is to provide a maintenance recommendation system that identifies a failure mode of a machine, the system including: an information input unit that inputs at least one or more inspection results necessary to identify a failure mode; a primary storage unit that stores the inspection result; a failure mode probability computing unit that estimates a probability of the failure mode from the at least one time or more inspection results; and a probability update unit that changes a criterion for calculating a probability in association with a change in a machine.

Even on devices that have been recently shipped to the market with a small amount of data collected, failure modes are accurately estimated to reduce useless replacement tasks, examination time is shortened, and thus time from failure to recovery of a device can be shortened.

DETAILED DESCRIPTION OF THE PREFERRED EMBODIMENTS

In the following, a mode for carrying out the present invention will be described with reference to the drawings. Embodiments will be described assuming that a device is a refrigerator including a vapor-compression freezer. The main point of the present invention is to correct an estimation model for an old model to be intended to a new model.

However, an estimation method using an estimation model is also described in the embodiments. As the embodiments, description will be given in order of the estimation of a failure mode of an old model, correction of an estimated estimation model, and estimation of the failure mode of a new model as a flowchart in FIG. 6.

Many new model devices are developed from derivation of old models, and components common to new and old model devices have the same failure modes and symptoms. However, since the reliability of components changes due to changes in suppliers or models, the occurrence probability of the failure mode also changes. Therefore, in a maintenance recommendation system according to the present invention, based on estimation models for older models, which have been created from knowledge experience, failure daily reports, and the like, the parameters of the estimation model categorized into: a) the occurrence probability of failure modes; and b) the probability of inspection items when a failure mode occurs, and only a) the occurrence probability of failure modes is corrected. For correction, information on failure modes written in the failure daily report is learned, or information on occurrence probability based on the acceleration test of a changed component is used, when such information is available. Even though information on inspection items is not available in the failure daily report, information on failure modes is available, and learning is possible.

First Embodiment

<Description of Components Constituting the First Embodiment>

Figure 1:
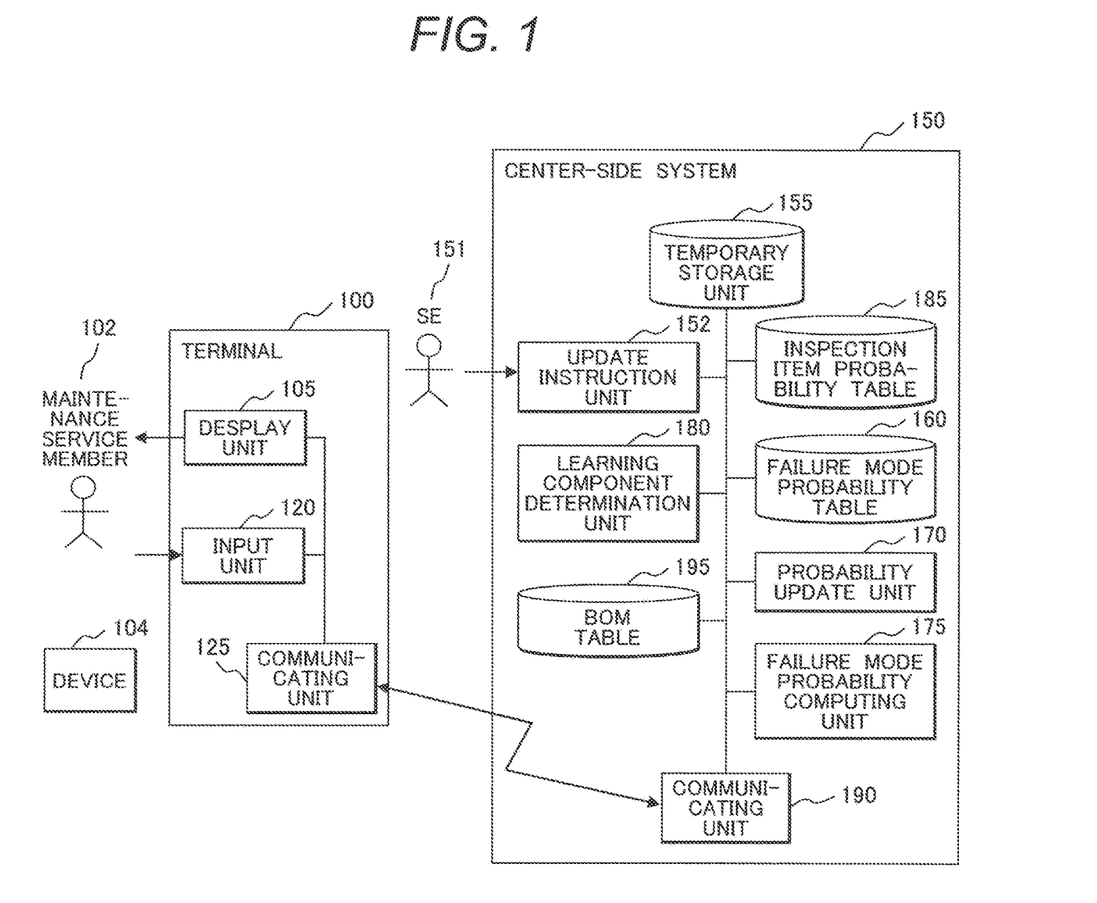
FIG. 1 is a block diagram of an overall maintenance recommendation system according to an embodiment.

In the overall structure of a maintenance recommendation system according to the present embodiment in FIG. 1, first, the maintenance recommendation system mainly includes a maintenance service member 102, a device 104, which does not work, repaired by the maintenance service member 102, a terminal 100 through which the maintenance service member 102 instructs failure mode estimation, and a center-side system 150 to which the terminal 100 is connected via communication.

Preferably, the terminal 100 is a light-weight tablet and the like, which is easily carried to the operating site of the device 104 by the maintenance service member 102. The terminal 100 has a display unit 105, which is a liquid crystal display and the like, and an input unit 120 formed of a touch display and the like. In the present embodiment, it is assumed that the maintenance service member 102 visits a customer having the device 104 and performs maintenance tasks and a plurality of maintenance service members shares the center-side system 150, and the terminal 100 and the center-side system 150 are separated. However, the terminal 100 and the center-side system 150 may be integrated with each other.

The device 104 according to the present embodiment is a device that is targeted for maintenance including power generators, construction devices, and medical devices. The components of the device 104 are inspected, the results are inputted to the terminal 100, and then the maintenance service member 102 obtains items that have to be subjected to subsequent inspection and the estimated result of failure modes. Even though the terminal 100 is built in the device 104, this is substantially equivalent to the contents of the present embodiment.

The center-side system 150 is a system that receives the inspection result of the device 104 inputted to the terminal 100 via communication and returns the failure mode and the item that has to be subjected to subsequent inspection, i.e., the inspection item candidate to the maintenance service member 102. Therefore, the center-side system 150 includes a communicating unit 190. The center-side system 150 can be constituted of a computer and the like including a storage unit, a central processing unit (CPU), a communicating unit, an input-output unit, and the like.

When a new model device is released, the center-side system 150 also updates a failure mode probability table 160 intended for the new model through an update instruction unit 152 by an SE 151, which maintains the center-side system 150. The update instruction unit 152 is constituted of a touch display or a liquid crystal display, and an input-output screen is presented.

The center-side system 150 has a primary storage unit 155 that stores results of inspection conducted by the maintenance service member 102, a failure mode probability computing unit 175 used for estimating the probability of a failure mode, a learning component determination unit 180 that determines whether a component is different between a new model and an old model, an update instruction unit 152 used by the SE 151 to instruct an update when the component is different, and a probability update unit 170 that executes an update instruction received through the update instruction unit 152. The probability update unit 170, the failure mode probability computing unit 175, and the learning component determination unit 180 are implemented by executing a predetermined program at the CPU.

<Description of Data Structures>

The data structures of an inspection item probability table 185, a failure mode probability table 160, and a BOM (Bill Of Materials) table 195, which are storage units storing data necessary in processing will be described with reference to FIGS. 2, 3A, 3B, 4A, and 4B. Other than the primary storage unit 155, initial values are defined to these storage units when the system according to the present embodiment is designed.

<Description of Inspection Item Probability Table 185>

Figure 2:
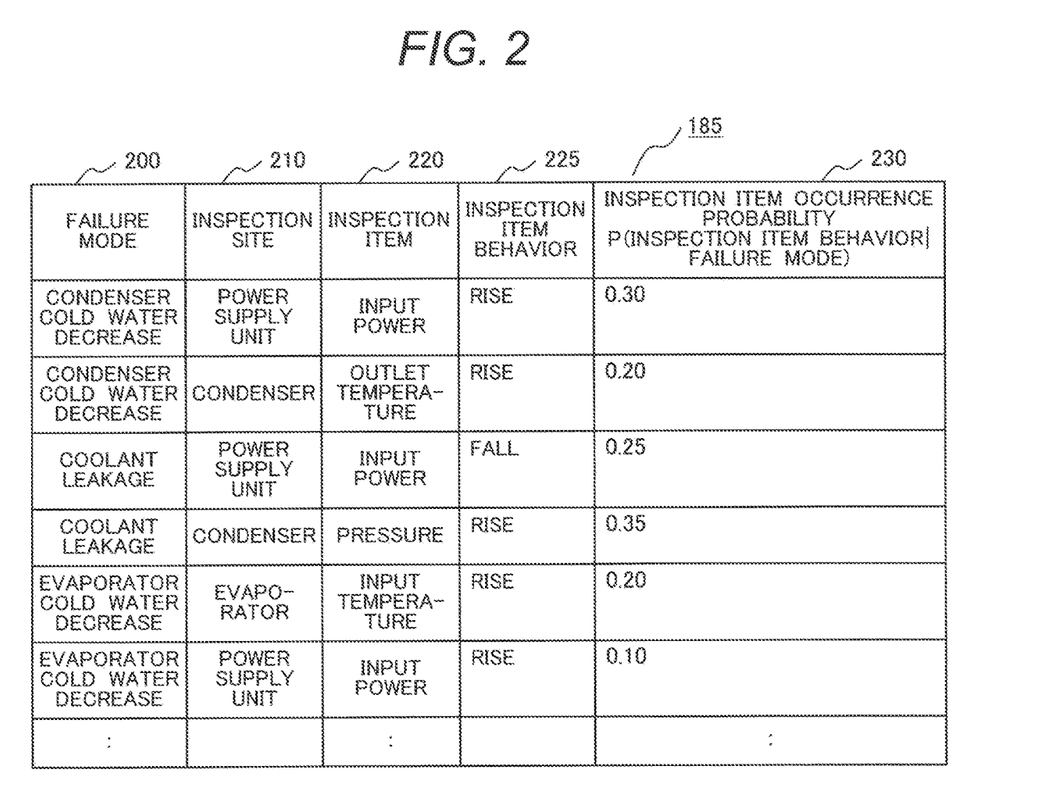
FIG. 2 is a diagram showing an example of a data structure according to a first embodiment.

As shown in FIG. 2, the present table is a table that stores "a probability 230 that an inspection item 220 of an inspection site 210 shows a behavior like an inspection item behavior 225 when a failure mode 200 occurs".

As the terms of the statistics, this probability 230 is a conditional probability, and can be said as a conditional probability P (inspection item behavior=True|failure mode=True) at which the inspection item behavior 225 occurs when the failure mode 200 occurs. For example, the first line in the table in FIG. 2 means that a probability at which when the failure mode 200, which is a condenser cold water decrease, occurs, the inspection item behavior 225, which is the input power of a power supply unit rises, is 0.30. This probability does not necessarily have to be a strict value. For example, the probability is estimated from experiences of the designer of the device 104 or the maintenance service member, the failure rate of a reliability database, experimental values in the past, failure simulation based on a physical model, and the like, or the probability is inputted in the design of a system to which the present embodiment is applied. From this conditional probability and the probability of the failure mode probability table 160 described next, a failure mode can be estimated.

<Description of the Failure Mode Probability Table 160>

Figure 3A:
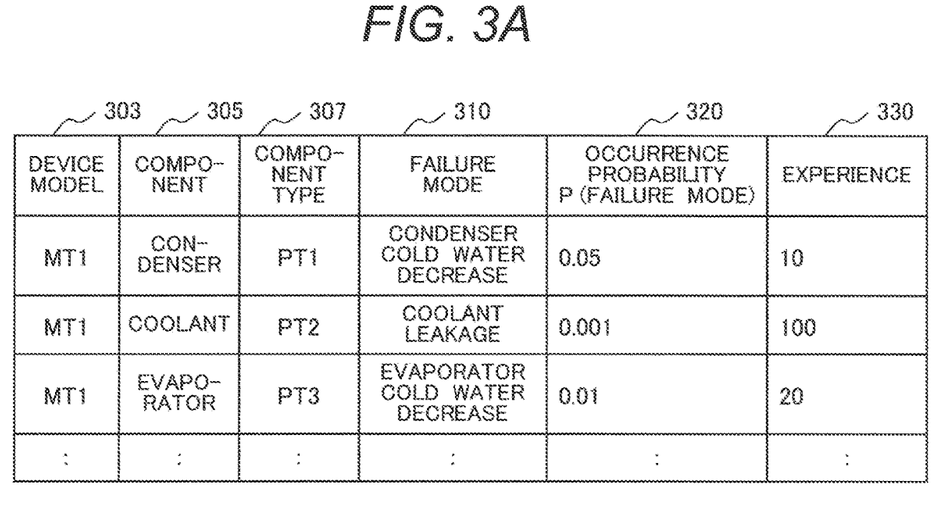
FIG. 3A is a diagram showing another example of a data structure according to the first embodiment.
Figure 3B:
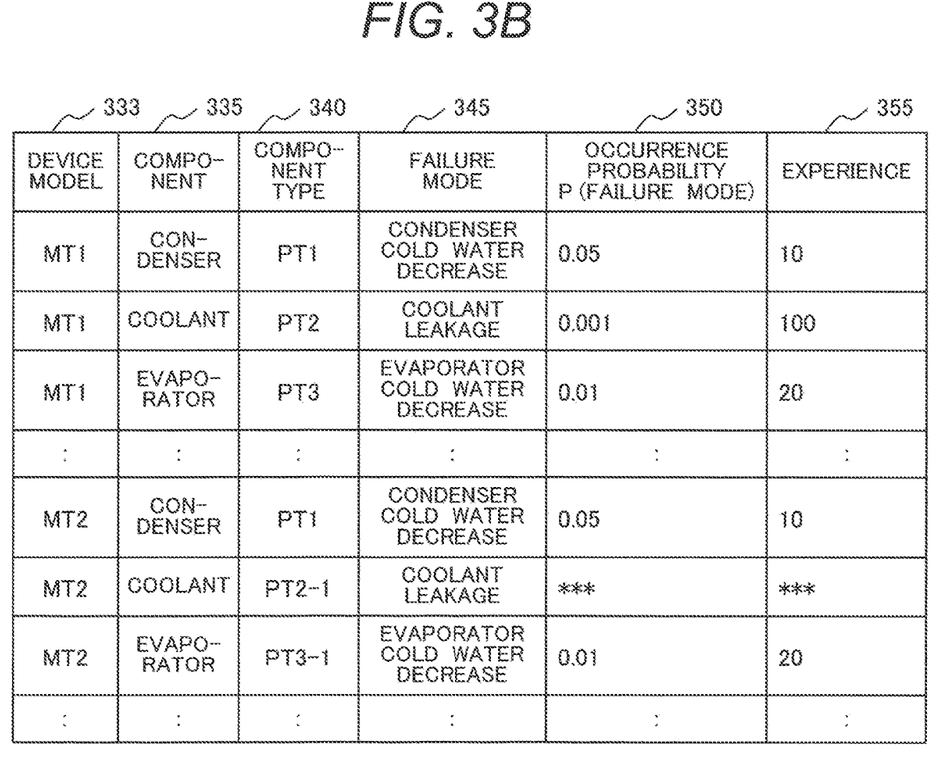
FIG. 3B is a diagram showing another example of a data structure according to the first embodiment.

The structure of the failure mode probability table 160 is shown in FIGS. 3A and 3B. FIG. 3A shows information on the components of an old model MT1. FIG. 3B is a table that information on failure modes of a new model MT2 is added in FIG. 3A, and information items 303 to 330 and the information items 333 to 355 have the same meanings. The information on the new model MT2 is added in S620 in FIG. 6. The information items 333 to 355 are the same as the information items 303 to 330, and the description is omitted.

The device model 303 means a device model before a failure mode occurs, and FIG. 3A shows the old model MT1, and FIG. 3B shows a table in which the new model MT2 is added to FIG. 3A.

The component 305 shows a component on which a failure mode occurs. For example, the failure mode 310, which is a condenser cold water decrease in the first line in FIG. 3A, is a failure mode relating to a condenser, a condenser is written on the component 305.

The component type 307 records a type of the component 305 used in the old model and the new model. For example, the component type in the second line from above in FIG. 3A is PT2. The third line from below in FIG. 3B, to which information on the new model MT2 is added, shows a coolant, and the component type 340 is PT2-1 while the same coolant is written. This is an example in which a component type is changed between the new model and the old model.

The failure mode 310 stores the name of the failure mode that occurs on the component 305, and the occurrence probability 320 stores its occurrence probability P. The failure mode 310 stores the same failure mode 200 in FIG. 2. However, in FIG. 3A, the conditional probability is not stored, and typical probabilities, at which failure modes occur, are stored in the occurrence probability 320. This probability is calculated from the number of failure modes having actually occurred so far, or created from information such as an occurrence probability described in the failure mode and effect analysis (FMEA) of the device 104.

In addition to above, Experience 330 has a parameter expressing the reliability of the occurrence probability 320. This parameter is a parameter that appears in the Bayesian updates where the prior distribution in the Bayesian statistics is a beta distribution. The parameters (the reliability parameters), namely the Bayesian updates and Experience, are in the range of publicly known techniques, and the parameters will be briefly desired below.

The initial value of Experience 330 is determined how much the value in 320 is reliable. For example, when the value is based on experience of a veteran engineer, or the value is physically properly reliable, the value is set to a large numerical character. After the initial value is defined, Experience 330 is increased every time when the probability update unit 170 updates the occurrence probability 320 based on failure daily reports generated day to day. This is based on the thought that a reliable probability backed by actual results grows higher as updates are made more with failure daily reports.

The corresponding relationship between the parameters a and b of the prior probability beta distribution well known as reference and Experience parameter is shown below. In the formula below, B means a beta function.

When the beta distribution is formula (1) below,

[Formula 1]

$$\frac{1}{B(a,b)} x^{a-1}(1-x)^{b-1} \quad \text{(Formula 1)}$$

Experience 330=a+b, the occurrence probability 320=a/a+b, or using this relational expression, e=Experience parameter, p=the occurrence probability 320 are defined, the beta distribution is expressed as formula (2).

[Formula 2]

$$\frac{1}{B(ep, e(p-1))} x^{ep-1}(1-x)^{e(p-1)-1} \quad \text{(Formula 2)}$$

<Description of the primary storage unit 155>

Figure 5:
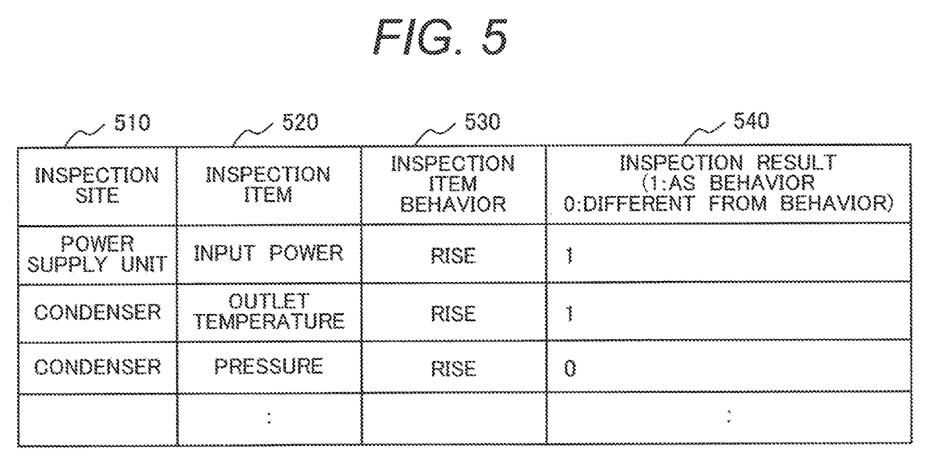
FIG. 5 is a diagram showing another example of a data structure according to the first embodiment.

FIG. 5 shows the data structure of the primary storage unit 155. First, the primary storage unit 155 is formed of a volatile memory such as a RAM. This is because the RAM is used for storing the results of inspection items done by the maintenance service member at the present site. From the inspection results, failure modes or items that have to be subjected to subsequent inspection are estimated. On information items 510, 520, and 530 of a data structure in FIG. 5, lines on which inspection is completed on information items 210, 220, and 225 in FIG. 2 are copied and stored. An inspection result 540 is the result inspected by the maintenance service member. On the inspection result 540, 1 is stored when the behavior is as defined on the inspection item behavior 530, or 0 is stored.

<Description of the BOM table 195>

The BOM table 195 is a component table on which component types of components constituting new model devices and old model devices as a BOM (Bill Of Materials). The BOM table 195 is a table that determines whether there is a component in a different type between the new model and the old model.

Figure 4A:
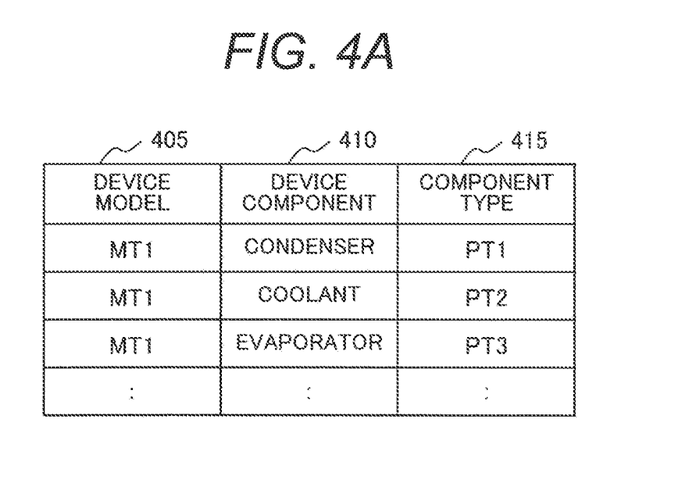
FIG. 4A is a diagram showing another example of a data structure according to the first embodiment.
Figure 4B:
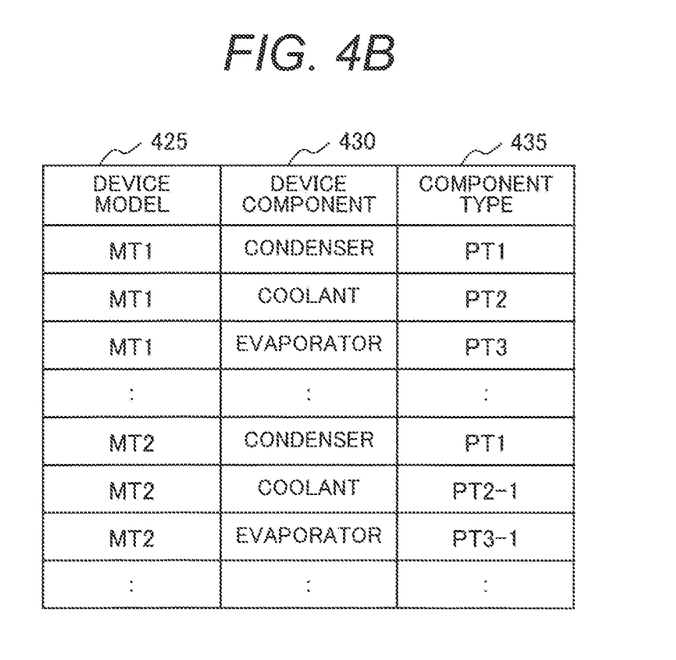
FIG. 4B is a diagram showing another example of a data structure according to the first embodiment.

FIGS. 4A and 4B show the internal structure of the BOM table 195. In FIG. 4A, 405 to 415 show the component type of the old model, and in FIG. 4B, 425 to 435 show that the component type of the new model is added. The addition is made in S620 of a flowchart in FIG. 6. The meanings of 405 to 415 and the meanings of 425 to 435 are the same, and the description of 425 to 435 is omitted. The device model 405 shows the model, the device component 410 shows the component constituting the device of the device model 405, and the type of the component is recorded on the component type 415. For example, the first line in FIG. 4A means that the device of model MT1 includes a condenser of type PT1.

<Description of the Main Routine>

Figure 8:
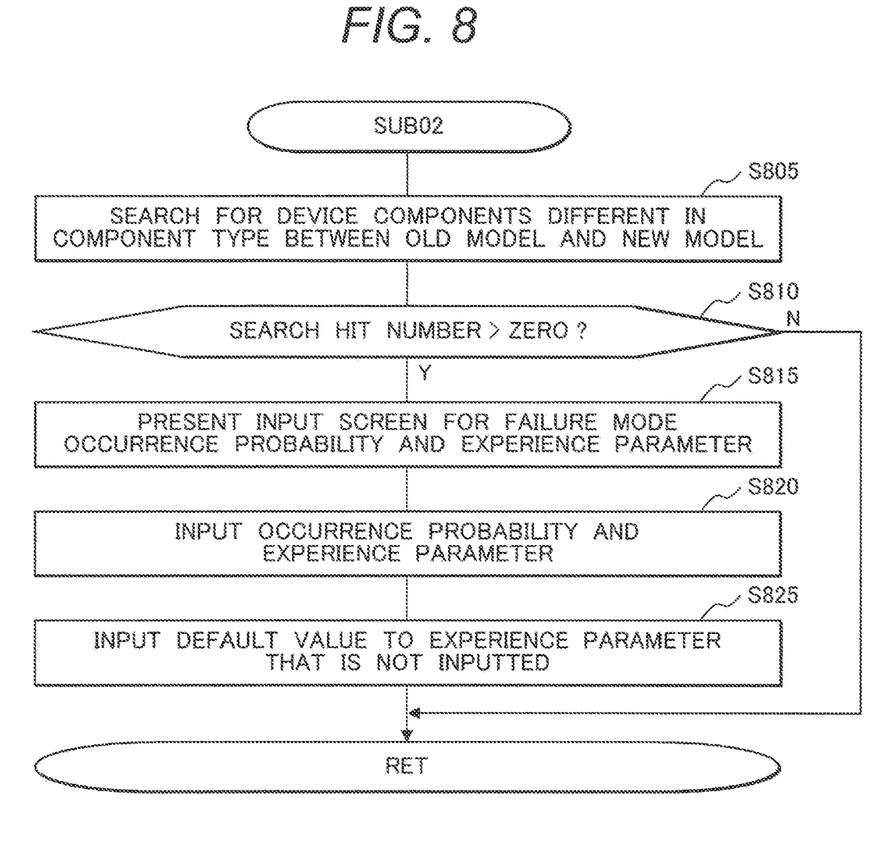
FIG. 8 is a diagram showing another example of a flowchart of process contents according to the first embodiment.
Figure 9:
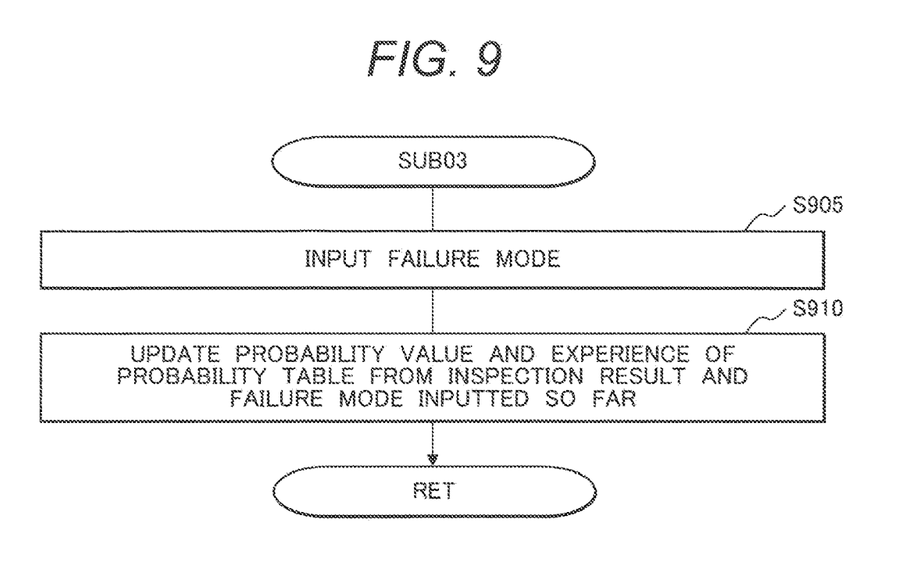
FIG. 9 is a diagram showing another example of a flowchart of process contents according to the first embodiment.
Figure 10:
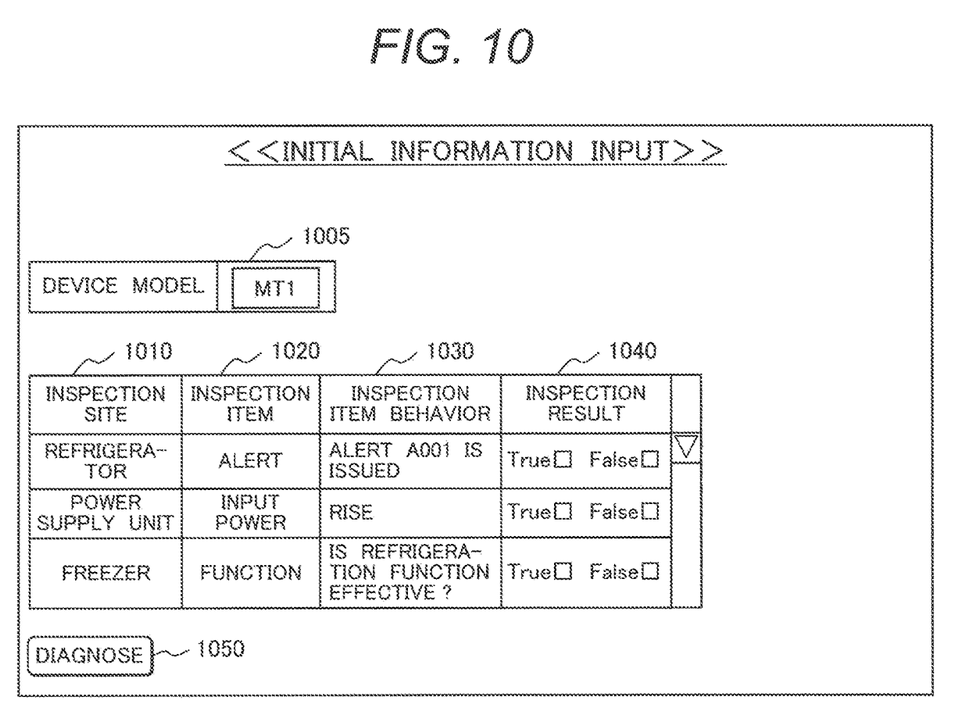
FIG. 10 is a diagram showing an example of a screen that is presented on a system according to the first embodiment.
Figure 11:
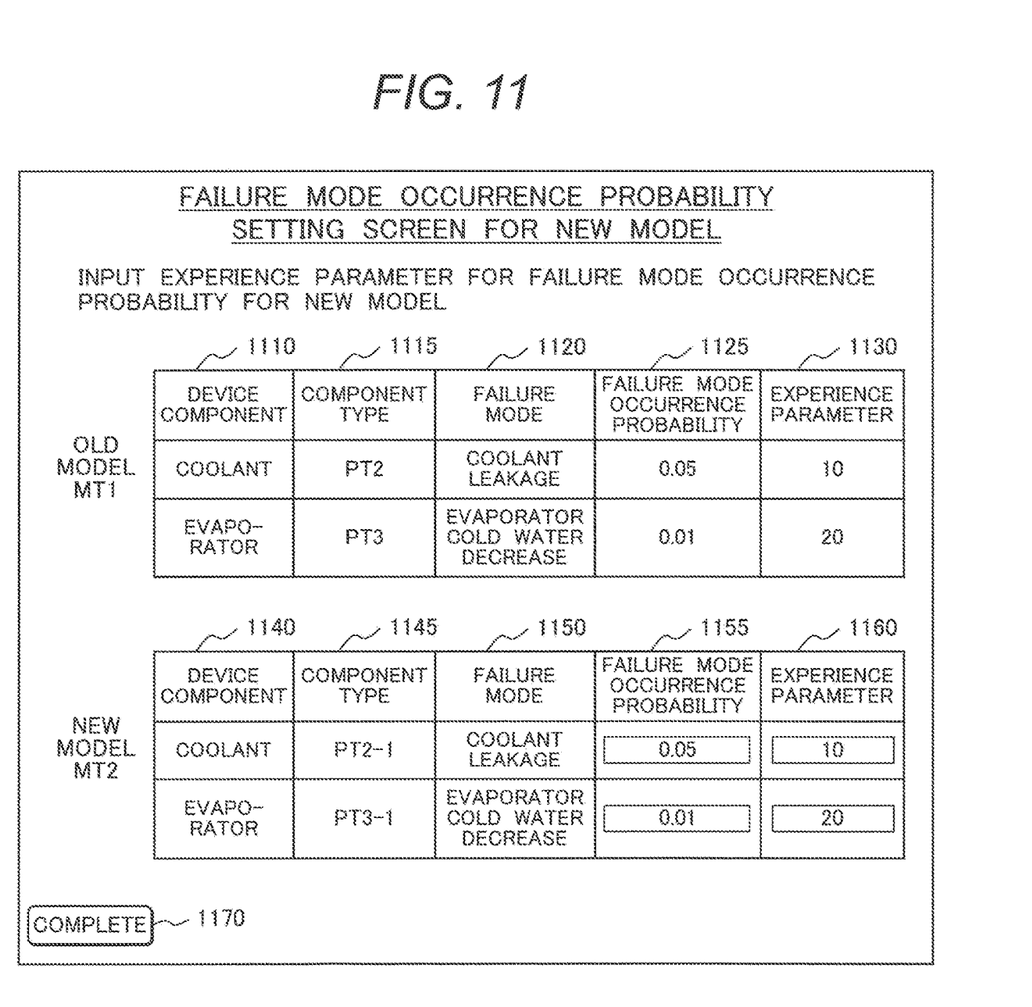
FIG. 11 is a diagram showing another example of a screen that is presented on the system according to the first embodiment.
Figure 12:
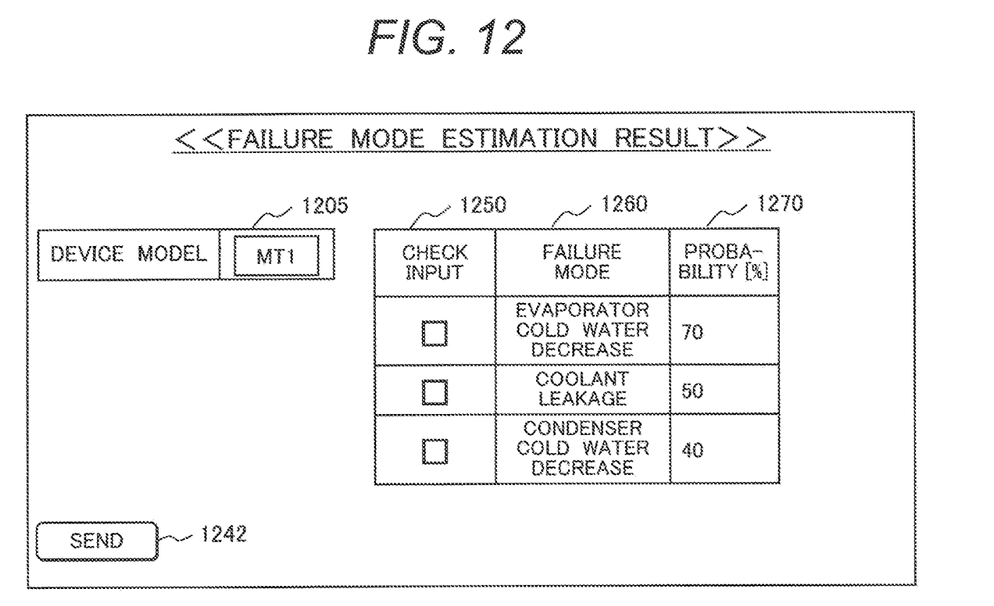
FIG. 12 is a diagram showing another example of a screen that is presented on the system according to the first embodiment.

Next, the detail of processes in flowcharts shown in FIGS. 6, 7, 8, 9 will be described, and in the processes, screen examples shown in FIGS. 10 to 12 are displayed.

Figure 6:
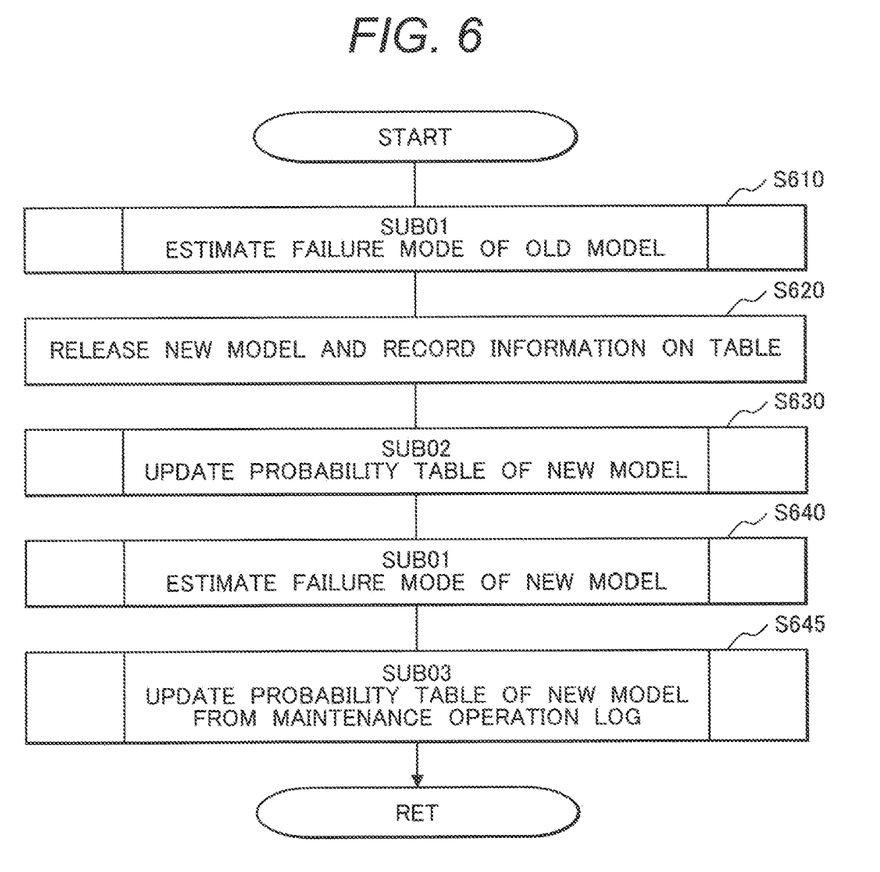
FIG. 6 is a diagram showing an example of a flowchart of process contents according to the first embodiment.
Figure 7:
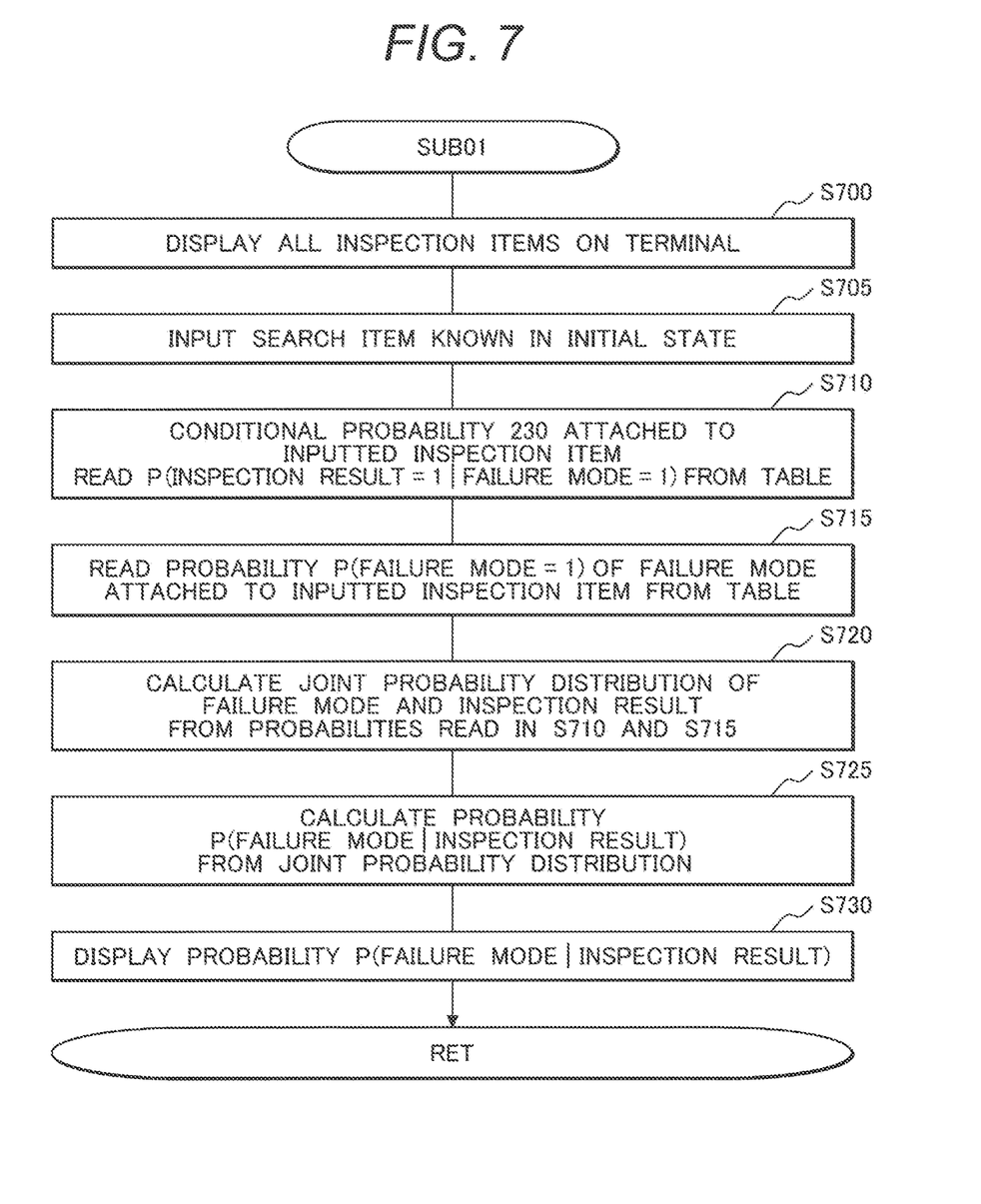
FIG. 7 is a diagram showing another example of a flowchart of process contents according to the first embodiment.

First, FIG. 6 is a main routine. In S610, subroutine SUB01 is called to estimate a failure mode for the old model. In FIG. 7, the detail of SUB01 will be described later. Every time when repair operation occurs, S610 is executed, and the process goes to S620 when a new model is released.

In S620, the BOM information on the new model is registered. Specifically, the type information of a component constituting the new model is added to the BOM table 195. Thus, the new model MT2 is added to FIG. 4A having information on the old model MT1 alone, and the table is changed to FIG. 4B including information on both of the new model and the old model.

In S630, subroutine SUB02 is called to update the probability of the failure mode of the released new model by the SE 151. In FIG. 8, SUB02 will be described later.

In S640, SUB01 is a routine that is called for the new model, and that estimates the failure mode. The estimation target for the failure mode is changed from the old model to the new model, and SUB01 is the same subroutine as S610.

In S645, the failure mode that actually occurs after estimation in S640 is registered, and subroutine SUB03 is called to update the probability of the failure mode. In FIG. 9, SUB03 will be described later.

<Description of subroutine SUB01>

Referring to FIG. 7, subroutine SUB01 that estimates the failure mode of the old model or the new model will be described.

SUB01 is a shared subroutine called from both S610 and S640. In S610, the failure mode of the old model MT1 is estimated, and in S640, the failure mode of the new model MT2 is estimated.

In the first Step S700, all inspection items are displayed on the terminal. This step is to make an input based on a symptom obtained from interviews of the user or the owner of the device beforehand before the arrival of the maintenance service member 102 on the site where a faulty device is present. As the manner of display, all the records of the inspection site 210, the inspection item 220, and the inspection item behavior 225 stored on the inspection item probability table 185 are read and displayed. Since the inspection items are common to the new model and the old model, no distinction is necessary.

FIG. 10 shows a screen example of inspection item display. The read information items 210, 220, and 225 in FIG. 2 are dispelled on 1010, 1020, and 1030. For use in S715, the maintenance service member 102 inputs the device model to 1005.

The inspection result 1040 displays words True and False and check boxes such that the inspection result can be inputted whether the inspection item 1020 behaves like the inspection item behavior 1030 (True) or not (False).

In S705, when initial information is available, which is known before the arrival of the maintenance service member 102 on the site where the faulty device is present, an input is made on the check box of the inspection result 1040 in FIG. 10. When the screen in FIG. 10 is displayed on the touch panel, the finger directly touches the check box, which allows a check input. For example, information is inputted, which is known without special operations, like dismounting, for example, the alert warning of the refrigerator of the device 104 is recorded like the first line in the table in FIG. 10, or the freezer is functioning. The maintenance service member 102 presses a diagnose button 1050. The inspection result is then stored on the primary storage unit 155. When the check result is True, 1 is stored, whereas when the check result is False, 0 is stored. After that, the process goes to the subsequent step, S710.

In S710, the inspection item probability table 185 is searched for the inspection item having True/False inputted in S705 in FIG. 2, and the conditional probability 230 (P (the inspection item behavior I the failure mode)) and the failure mode 200 are read.

In S715, 303 is searched for the device model inputted in 1005, 310 is stretched for the failure mode 200 read in S710 as keys, and the occurrence probability 320 (P (the failure mode)) of the failure mode 310 is read. For the device model 303, the maintenance service member 102 inputs the model of the device 104 through the input unit 120.

In S720, the joint probability P (a plurality of inspection item behaviors, a plurality of failure modes) of the inspection item behavior and the failure mode is determined from a plurality of probabilities P (the inspection item behavior-|the failure mode) and P (the failure mode) read in S710 and S715.

This process is based on a previously existing technique called a Bayesian network, and a calculation method will be briefly described. For explanation, the Bayesian network used in the present embodiment is shown in FIG. 13.

Figure 13:
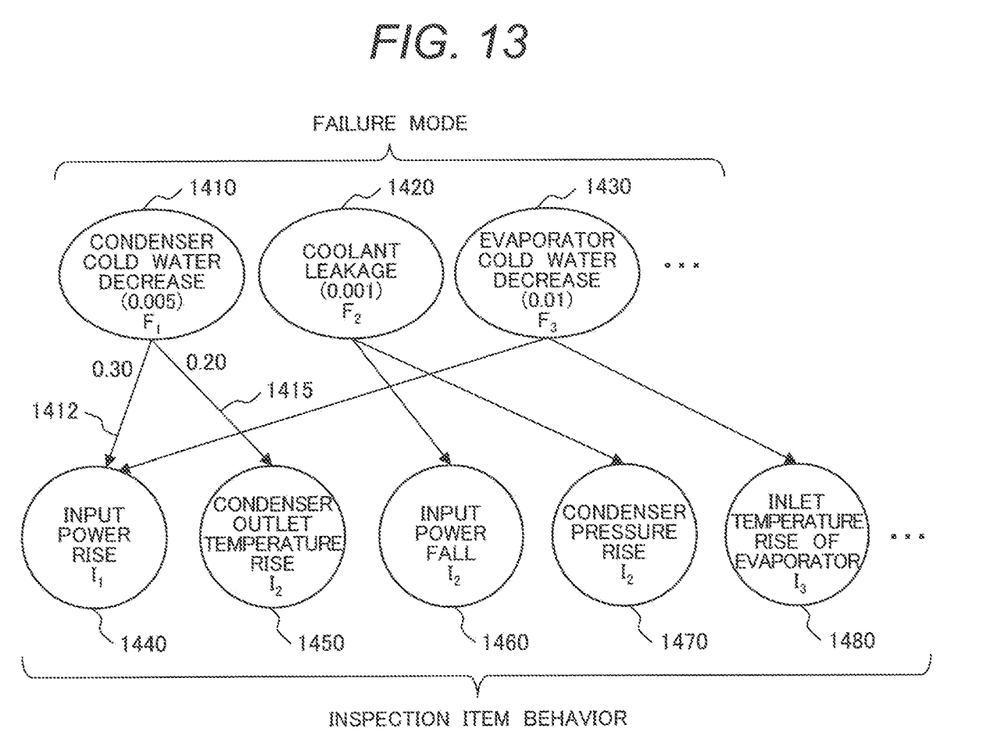
FIG. 13 is a diagram illustrating an algorithm of the system according to the first embodiment.

FIG. 13 is a network in which failure modes 1410, 1420, and 1430 are attached to inspection item behaviors 1440, 1450, 1460, 1470, and 1480. The failure modes 1410, 1420, and 1430 correspond to the failure mode 200 in FIG. 2, and the inspection item behaviors 1440, 1450, 1460, 1470, and 1480 correspond to the information items 210, 220, and 225 relating to the inspection items. Arrow lines including 1412 extending from the failure mode to the inspection item behavior correspond to the conditional probability 230 from the failure mode to the inspection item behavior. The numerical character, 0.30, written as an example in 1412, is the probability P (the inspection item behavior|the failure mode) of the inspection item occurrence probability 230. The failure mode, for example, the numerical character, 0.005, written in 1410, is the probability P (the failure mode) of the occurrence probability 320 in FIG. 3.

In the Bayesian network in FIG. 13, the joint probability P (a plurality of the inspection item behaviors, a plurality of the failure modes) of the inspection item behavior and the failure mode is expressed using symbols $F_1$ showing the failure mode and $I_1$ showing the inspection item behavior in FIG. 13, a formula below is held.

[Formula 3]

$$P(F_1=f_1, F_2=f_2, \ldots, F_J=f_J, I_1=I_2=i_2, \ldots, I_K=i_K) \quad \text{(Formula 3)}$$

In order to find this, a formula blow only has to be calculated.

[Formula 4]

$$P(F_1=f_1, F_2=f_2, \ldots, F_J=f_J, I_1=i_1, I_2=i_2, \ldots, I_K=i_K) = \Pi_{k=1}^{K}(\Pi_{j=1}^{J} P(I_k=i_k|F_j=f_j)^{f_j})\Pi_{j=1}^{J} P(F_j=f_j) \quad \text{(Formula 4)}$$

here, P $(I_k=i_k|Fj=fj)$ is P (the inspection item behavior|the failure mode) read in S800, and it is assumed that J items are read in total in formula (4). P (Fj=fj) is P (the failure mode) read in S810, and it is assumed that K items are read in total. fj is a value that takes 1 (True) when the failure mode occurs, or 0 (False) if not. $i_k$ is a numerical value expressing the inspection result of the inspection item $I_k$, and takes 1 (True) when the search item is as a behavior, or 0 (False) if not. Information on 0, 1 is acquired with reference to the inspection result 1040 in FIG. 10.

For derivation of the formulas, factoring of the Bayesian network and the previously existing technique of the Bayesian network called Noisy-OR are used. After the calculation of formula (4), the process in S820 is fined, and the process goes to S840.

In S840, the joint probability of the formula below found in S820 is calculated.

[Formula 5]

$$P(F_1=f_1, F_2=f_2, \ldots, F_J=f_J, I_1=i_1, I_2=i_2, \ldots, I_K=I_K) \quad \text{(Formula 5)}$$

The probability of the formula below of the jth failure mode selecting the inspection result is calculated from formula 5.

[Formula 6]

$$P(F_j=f_j|I_1=i_1, I_2=i_2, \ldots, I_K=I_K) \quad \text{(Formula 6)}$$

For the calculation, formula (7) below only has to be calculated.

[Formula 7]

$$P(F_j = f_j \mid I_1 = i_1, I_2 = i_2, \ldots, I_K = i_K) = \frac{\sum_{i \neq j}^{K} \sum_{f_j=0}^{f_j=1} P(F_1 = f_1, F_2 = f_2, \ldots, F_J = f_J, I_1 = i_1, I_2 = i_2, \ldots, I_K = i_K)}{\sum_{i=1}^{K} \sum_{f_j=0}^{f_j=1} P(F_1 = f_1, F_2 = f_2, \ldots, F_J = f_J, I_1 = i_1, I_2 = i_2, \ldots, I_K = i_K)}$$

(Formula 7)

The formula means the conditional probability that takes the jth failure mode $F_j=f_j$ where the inspection items are $I_l$ to $I_K$ and the inspection results are $i_l$ to $I_K$. This is the probability of the failure mode estimated from the inspection results.

In S730, the probability of the failure mode is displayed. FIG. 12 shows a screen example for display. The maintenance recommendation system according to the present embodiment includes a display unit on which the probability of the failure mode estimated by the failure mode probability computing unit 175 is displayed.

In FIG. 12, 1205 shows a model the same as 1005, and a failure mode 1260 shows the probability higher Nth place of the estimated result, and the probability 1270 shows its probability. The check input 1250 is an input item that shakes the failure mode truly occurs. When the failure mode 1260 is treated to fix the device, this can be a real failure mode. However, the check result is not used in calling in S610 targeted for the old model, and the check result is used only in the case of a call in S640. As described above, the subroutine SUB01 is finished, and the process returns to S610 in FIG. 6.

<Description of Subroutine SUB02>

Subroutine SUB02 is the subroutine that is a key to the maintenance recommendation system according to the present embodiment, and the subroutine will be described with reference to FIG. 8.

In S805, the BOM table 195 is searched to find a device component whose component type is changed from the old model MT1 to the new model MT2. Specifically, the old model MT1 to the new model MT2 is searched for the search key of the device model 425, and a device component 430 having a different component type 435 is searched. In the present embodiment, the coolant is changed from the component type PT2 to PT2-1, and the evaporator is changed from PT3 to PT3-1. In the search results, the old model is changed in "the coolant PT2" and "the evaporator PT3", and the new model is changed in "the coolant PT2-1" and "the evaporator PT3-1". This result is displayed in S815.

In S810, the process goes to S815 when one or more search results are found in S805, and when not, the component of the same type is used in the new model and the old model, and SUB02 is finished.

In S815, the search result in S805 is displayed as shown in FIG. 11. In FIGS. 11, 1110 to 1130 in the upper part show the old model, and 1140 to 1160 in the lower part show information on components changed in the new model. For the new model, the SE 151 inputs 1155 and 1160 in the coolant and the evaporator.

In 1110 and 1115, which are information on the old model, "the coolant PT2" and "the evaporator PT3" are displayed, which are search results in S805. In the failure mode 1120, searches are made for 340 in FIG. 3B using PT2 and PT3 as keys, and the failure mode 345 is displayed on 1120, the occurrence probability 350 is displayed on 1125, and Experience 355 is displayed on 1130. The same applies to 1140 to 1160 displayed for the new model.

The SE 151 inputs 1155 and 1160 while observing 1110 to 1130 for the old model. The value of 1155 is the failure mode occurrence probability of the device component, and 1160 is an Experience parameter showing its reliability.

Assuming that a simulation failure experiment or an acceleration test for the component is conducted and 1155 has to be highly reliable, the test result is set and the value of the Experience parameter is also set to a higher value like 100. Alternatively, when the occurrence probability is estimated to be lower than that of the previous component, if the situation is not so obviously demanding, the value that is one of several parts of the value of 1125 for the old model is set to 1155, and the Experience parameter 1160 is set lower. The Experience parameter 1160 is set to a lower value, and 1155 is quickly learned from the maintenance operation log in SUB03 called in S645 performed after this step.

As described above, the maintenance recommendation system according to the present embodiment can display the setting screen on which the occurrence probability of the failure mode of the new model is inputted. The setting screen of the display unit can input the Experience parameter (the reliability parameter).

<Description of Subroutine SUB03>

In S905 of subroutine SUB03 shown in FIG. 9, selection is made from the failure mode of the failure mode higher Nth place displayed as in FIG. 12, and a true failure mode is checked in the check input 1250. In FIG. 12, ones displayed in the inside of SUB01 called in S640 are used.

In S910, from the inspection result 1040 inputted by the maintenance service member 102 in S640 and the failure mode checked in S905, the probability and Experience in FIGS. 3A and 3B are updated. This is a publicly known technique as the Bayesian updates. The case will be described in which the failure mode probability tables in FIGS. 3A and 3B are simply updated. Assuming that e=Experience 330 and p=the occurrence probability P (the failure mode) 320, formulas for updates are as below.

$$e \rightarrow e+1$$

$$p \rightarrow (ep+1)/(e+1)$$

For example, in the case of a condenser cold water decrease in the first lines in FIGS. 3A and 3B, the formulas above are as $$e \rightarrow 10+1=11$$

$$p \rightarrow (10 \times 0.05+1)/(10+1) \approx 0.136$$

After the completion of these updates, SUB03 is finished, the process returns to S750, and then the process of the maintenance recommendation system according to the present embodiment is completed.

The present invention is not limited to the embodiment and the exemplary modification described above, and various exemplary modifications are further included. For example, the foregoing embodiment and the foregoing exemplary modification are described in detail for easy understanding of the present invention, and the present invention is not necessarily limited to those including all the configurations described above. A part of the configuration of an embodiment or an exemplary modification may be replaced by the configuration of another embodiment or an exemplary modification. Moreover, the configuration of another embodiment or an exemplary modification may be added to the configuration of an embodiment or an exemplary modification. In regard to a part of the configuration of the embodiments and exemplary modifications, a configuration included in another embodiment or an exemplary modification may be added, removed, or replaced.

REFERENCE SIGNS LIST

100 . . . terminal-side system
102 . . . maintenance service member
104 . . . device
105 . . . display unit
120 . . . input unit
125, 190 . . . communicating unit
150 . . . center-side system
151 . . . SE
152 . . . update instruction unit
155 . . . temporary storage unit
160 . . . failure mode probability table
170 . . . probability update unit
175 . . . failure mode probability computing unit
180 . . . learning component determination unit
185 . . . inspection item probability table
195 . . . BOM table
200 . . . failure mode
210, 510 . . . inspection site
220, 520 . . . inspection item
225, 530 . . . inspection item behavior
230 . . . inspection item occurrence probability
303, 333, 405, 425 . . . device model
305, 335 . . . component
307, 340, 415, 435 . . . component type
310, 345 . . . failure mode
320, 350 . . . occurrence probability
330, 355 . . . Experience
410, 430 . . . device component
540 . . . inspection result

What is claimed is:

1. A maintenance recommendation system that identifies a failure mode of an inspection item, the system comprising:
an information input unit configured to receive, as an input, at least one or more inspection results necessary to identify a failure mode; and
a computer configured to
store therein (i) the inspection result, (ii) a failure mode probability table containing recorded information relating to a probability of occurrence of the failure mode, and (iii) an inspection item probability table containing information relating to a probability that an inspection item exhibits specified inspection item behavior when the failure mode occurs;
estimate the probability of the failure mode from the at least one time or more inspection results and the information from the failure mode probability table and the inspection item probability table;
change a criterion for calculating a probability in association with a change in the inspection item; and
among the failure mode probability table and the inspection item probability table, update only the failure mode probability table when the change in the inspection item occurs.

2. The maintenance recommendation system according to claim 1, wherein the computer is configured to change the probability of occurrence of the failure mode.

3. The maintenance recommendation system according to claim 1, wherein when a component attached to the failure mode is changed before and after the inspection item is changed, the computer is configured to change a criterion for calculating the probability of occurrence of the failure mode.

4. The maintenance recommendation system according to claim 3, wherein the computer is configured to perform a learning component determination to determine whether a component attached to the failure mode is different before and after the inspection item is changed.

5. The maintenance recommendation system according to claim 3, wherein when a component attached to the failure mode is changed before and after a machine is changed, the probability update unit changes a criterion for calculating the probability based on a record of maintenance operation.

6. The maintenance recommendation system according to claim 3, wherein when a component attached to the failure mode is changed before and after a machine is changed, the probability update unit changes a criterion for calculating the probability based on a test result of the component.

7. The maintenance recommendation system according to claim 6, wherein the probability update unit changes an occurrence probability of the failure mode.

8. The maintenance recommendation system according to claim 6, comprising a display unit that displays a setting screen to which an occurrence probability of the failure mode of a new model is inputted.

9. The maintenance recommendation system according to claim 8, wherein the setting screen of the display unit is capable of accepting an input of a reliability parameter.

10. The maintenance recommendation system according to claim 8, wherein the display unit displays a probability of the failure mode estimated by the failure mode probability computing unit.

* * * * *